Only one [illegible] on this [illegible] ([illegible])
Charles Newbold.
Cast Iron Plough.
Vol. 2. pg. 246.
[illegible] 26th June 1797.
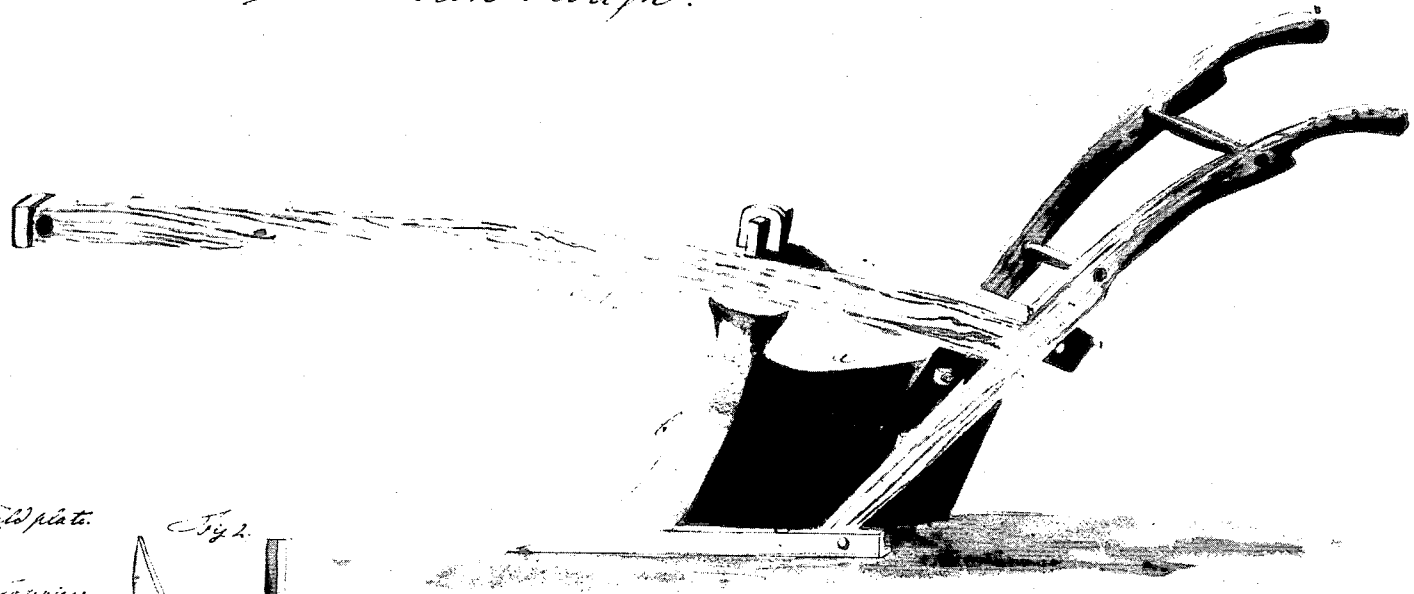
References.
a. [illegible] mould plate.
b. the [illegible].
c. the [illegible]
Fig. 1. Sideview Fig. [illegible]
Fig 2.
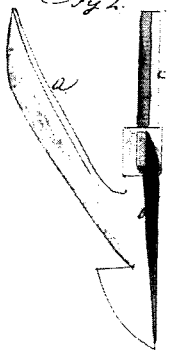
Patent Office
[illegible] Commiss
of Patents in conformity with act of
Congress of 3 March 1837
Henry L. Ellsworth
Commissioner of Patents.
Correct
C. M. Keller
177X Entered.
Charles Newbold's Plough.
Patented: 26th June: 1797.
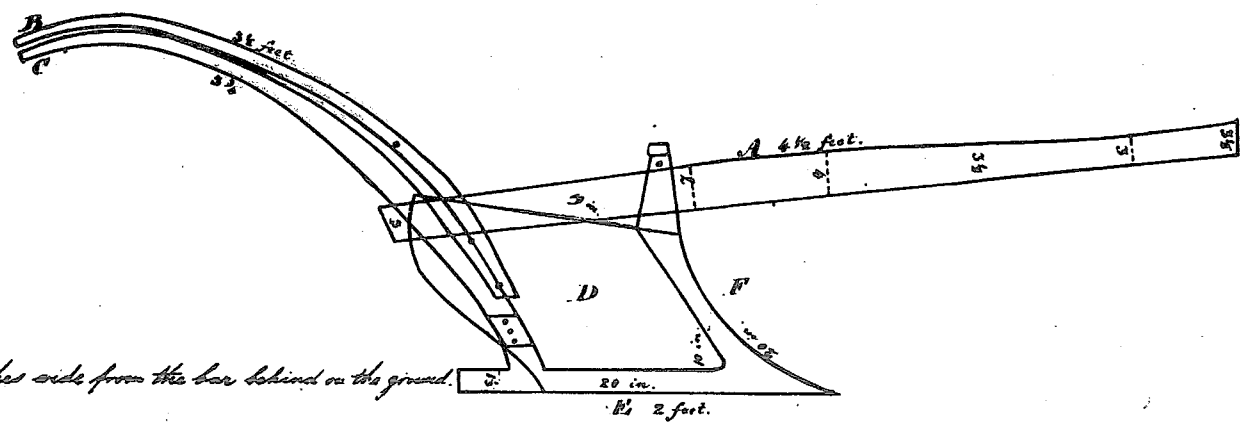
A. The beam.
B. Right hand handle.
C. Left hand handle.
D. Mould plate, 11 inches wide from the bar behind on the ground.
E. The bar.
F. The sheath.

Charles Newbold

Letters Patent (June 26. 1797.)

The Schedule referred to in these Letters Patent, and making part of the the same, containing a description in the words of the said Charles Newbold himself, of an improvement in Ploughs.

Specification.

The subscriber, Charles Newbold, of Burlington County and State of New Jersey, has invented an improvement in the art of plough-making, as follows: (viz:) The plough to be (excepting the handles and beam) of solid cast iron, consisting of a bar, sheath, and mould-plate. The sheath serves a double purpose of coutter and sheath, and the mould plate serves for share and mould-board, that is to cut and turn the furrow.

The forms to be varied, retaining the same general principles to meet the various uses, as well as inclinations of those who use them.

Philadelphia 17th June 1797 } Charles Newbold
John Allen } Witnesses present }
Uriah Tracy } at the signing }

Exd. W.G.C. (150 words)

To all to whom these Presents shall come Greeting:

I Certify, That the annexed is a true copy of a patent granted to Charles Newbold, for an improvement in ploughs, on the 26th of June, 1797; also, that the annexed drawing is a true copy of the one deposited on his application for a patent, in the same month and year as aforesaid.

(L. S.) In testimony whereof, I, Henry Clay - Secretary of

State of the United States, have hereunto subscribed my name, and caused the seal of the Department of State to be affixed. Done at the City of Washington, this sixteenth day of May, A. D. 1827, and of the Independence of the United States of America the fifty-first.

H. Clay (Rec.d December 9th 1839. & Recorded anew)

(Texas)
N.96.